Pierpont & Tuttle,
Plow Fastening.
No. 108,512. Patented Oct. 18, 1870.
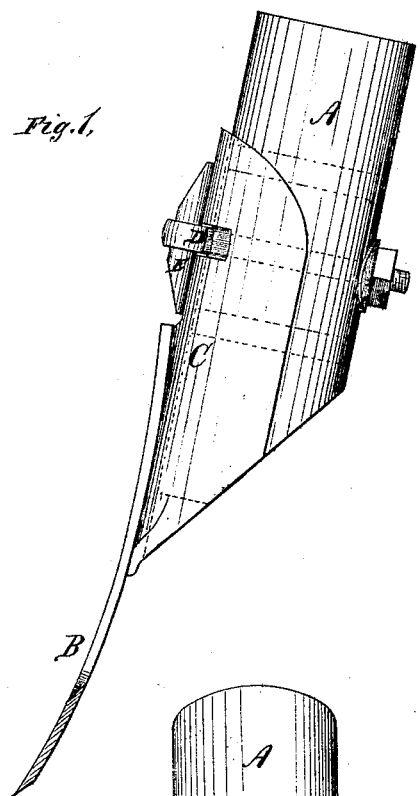
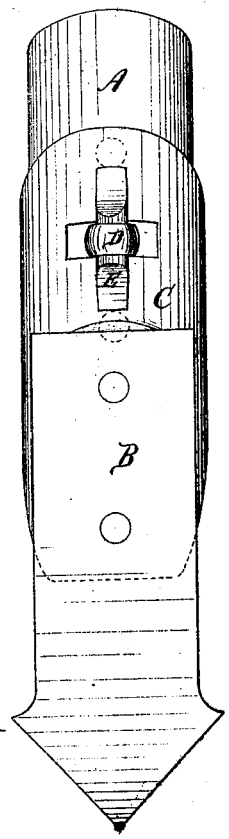
Witnesses:
Benson Nichols
Charles Ketter
Inventor.
Joshua Pierpont
Sidney S. Tuttle

UNITED STATES PATENT OFFICE.

JOSHUA PIERPONT AND SIDNEY S. TUTTLE, OF LA HARPE, ILLINOIS.

IMPROVEMENT IN FASTENINGS FOR SHOVELS FOR CULTIVATORS AND PLOWS.

Specification forming part of Letters Patent No. 108,512, dated October 18, 1870.

*To all whom it may concern:*

Be it known that we, JOSHUA PIERPONT and SIDNEY S. TUTTLE, of La Harpe, in the county of Hancock and State of Illinois, have invented a certain Improvement in Fastening Shovels or Plows to Standards, of which the following is a specification.

The first part of our invention relates to the combination of a properly pressed and punched wrought-iron or other metal holder, with a shovel-blade and plow-standard, the object of this part of our invention being to attach a shovel or plowshare to a standard in such a novel manner that it will be held firm, and, being of wrought-iron or other metal, be light and strong, and admit of the shovel being raised or lowered to plow shallow or deep, and turned either way, to throw dirt to or from the plants.

The second part of our invention relates to the combination of the shovel-holder with transverse slot and eyebolt and wooden pin, constituting a safety-pin, to prevent breakages when plowing among stumps or roots.

The object of this invention is to provide a safety-pin of wood, which will hold the shovel firmly in position, but which will break when the shovel comes in contact with any unyielding obstruction, allowing the shovel to fall away from the standard, and thus preventing any injury being done to the plow.

In the accompanying drawings, Figure 1 is a side view of our improvement in shovel fastenings or holders in proper and combined position, showing the manner in which the shovel is held to the standard. Fig. 2 is a front view of the same.

A is the standard, which is turned around to receive the inner concave surface of the shovel-holder C. It, A, has a succession of holes, through one of which the eyebolt D passes. The other holes are for the purpose of raising or lowering the shovel.

B is the shovel, which is riveted to the shovel-holder C.

C is the shovel-holder, pressed into shape to fit the standard A. It, C, has a projection pressed outward at the upper rivet-hole, to give the shovel the proper pitch when put upon the standard A. It, C, projects above the shovel B a proper distance, and has a transverse slot in this projection near the top, through which the eyebolt or any common bolt may pass. The slot is for the purpose of allowing the shovel B to revolve or turn upon the standard A. The shovel-holder C is pressed flat at its lower end, to rest upon and prevent the shovel B from rocking.

D is the eyebolt, with eye for the reception of a pin and thread and nut upon the other end.

E is a wooden pin, tapered from the front on each end, to prevent trash from catching upon it.

In Fig. 1 the invention is fully shown, the shovel B being riveted to the shovel-holder C, and placed upon the standard A and held there by the eyebolt D and wooden pin E.

The advantages of this fastening are, first, that the shovel can be raised or lowered or turned either way at pleasure; second, by the use of wrought-iron pressed into this form great strength can be obtained in connection with lightness; third, the fastening projecting above the shovel to receive the connecting-bolt lessens the strain on the bolt by giving a long leverage; fourth, the shovel is brought in proximity to the standard; fifth, by the use of the safety-pin, when an obstruction is met with the pin breaks and the shovel falls off without damage to the plow; sixth, by this shovel-holder the lower end of the standard is carried high, offering no obstruction to free side movement, and presenting no projections for the accumulation of dirt.

We claim as our invention—

The combination of the eyebolt D and the wooden pin E with the standard A and the shovel-holder C, made and constructed substantially as and for the purpose hereinbefore set forth.

JOSHUA PIERPONT.
SIDNEY S. TUTTLE.

Witnesses:
BENSON NICHOLS,
CHARLES KETTER.